United States Patent
Hiatt

(10) Patent No.: US 9,181,969 B1
(45) Date of Patent: Nov. 10, 2015

(54) DECORATIVE SCREWS

(71) Applicant: Nathan R. Hiatt, Oakland, CA (US)

(72) Inventor: Nathan R. Hiatt, Oakland, CA (US)

( * ) Notice: Subject to any disclaimer, the term of this patent is extended or adjusted under 35 U.S.C. 154(b) by 0 days.

(21) Appl. No.: 14/270,497

(22) Filed: May 6, 2014

(51) Int. Cl.
*F16B 35/06* (2006.01)
*F16B 23/00* (2006.01)

(52) U.S. Cl.
CPC .................................. *F16B 23/0069* (2013.01)

(58) Field of Classification Search
CPC .. F16B 23/00; F16B 23/0038; F16B 23/0069; F16B 23/0084; F16B 23/0007; A47G 3/00
USPC ........................................................ 411/402
See application file for complete search history.

(56) References Cited

U.S. PATENT DOCUMENTS

| | | | |
|---|---|---|---|
| 3,693,495 A | 9/1972 | Wagner | |
| D243,154 S | 1/1977 | Dieme | |
| D264,552 S | 5/1982 | Bogren | |
| 5,360,639 A | 11/1994 | Kawabata | |
| 5,449,260 A * | 9/1995 | Whittle | 411/377 |
| 5,538,377 A * | 7/1996 | Stewart et al. | 411/174 |
| 7,713,012 B2 | 5/2010 | Coonjohn | |
| 2003/0152441 A1* | 8/2003 | Monson | 411/401 |
| 2006/0182513 A1* | 8/2006 | Dortch | 411/338 |
| 2008/0286071 A1 | 11/2008 | Potter | |
| 2012/0155989 A1 | 6/2012 | Zack | |
| 2014/0144300 A1* | 5/2014 | Marchand | 81/467 |

FOREIGN PATENT DOCUMENTS

WO    WO 2012/143569 A1 * 10/2012

* cited by examiner

*Primary Examiner* — Roberta Delisle
(74) *Attorney, Agent, or Firm* — Kyle A. Fletcher, Esq.

(57) ABSTRACT

The ornamental fastener assembly for enhancing an appearance of an object includes a head. The head has an outer edge defining an ornamental shape. A shaft is coupled to the head. The shaft penetrates the object. The head is coupled to the object.

16 Claims, 3 Drawing Sheets

US 9,181,969 B1

DECORATIVE SCREWS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of screws, more specifically, decorative screws.

B. Summary of the Invention

An embodiment of the disclosure meets the needs presented above by generally comprising a head. The head has an outer edge defining an ornamental shape. A shaft is coupled to the head. The shaft penetrates the object. The head is coupled to the object.

An object of the invention is to provide a device that is decorative screws.

These together with additional objects, features and advantages of the decorative screws will be readily apparent to those of ordinary skill in the art upon reading the following detailed description of presently preferred, but nonetheless conjunction with the accompanying drawings.

In this respect, before explaining the current embodiments of the decorative screws in detail, it is to be understood that the decorative screws is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the decorative screws.

It is therefore important that the claims be regarded as including such equivalent construction insofar as they do not depart from the spirit and scope of the decorative screws. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
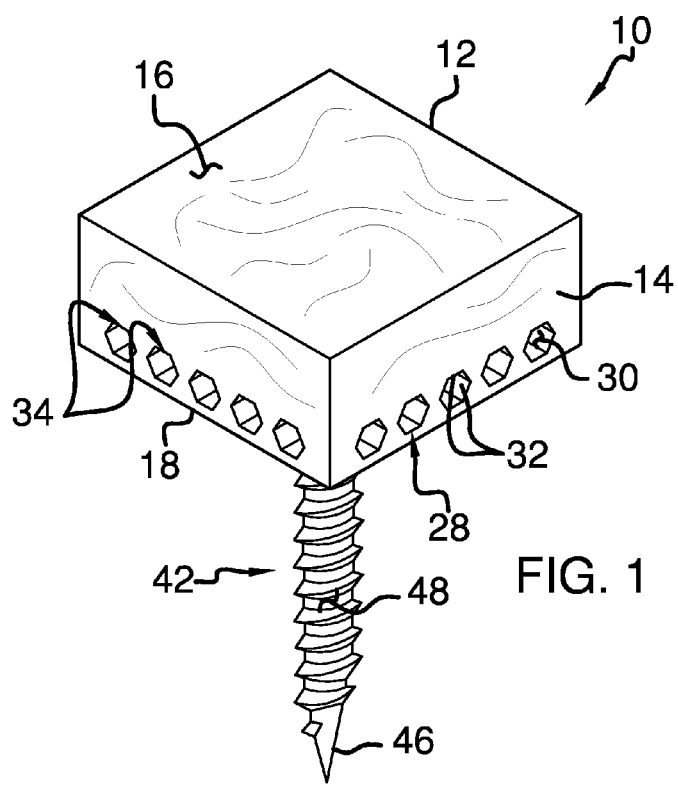
FIG. 1 is a perspective view of a ornamental fastener assembly according to an embodiment of the disclosure.
Figure 2:
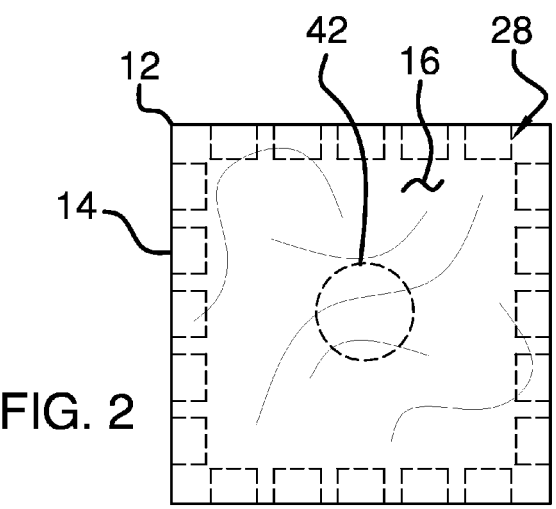
FIG. 2 is a top view of an embodiment of the disclosure.
Figure 3:
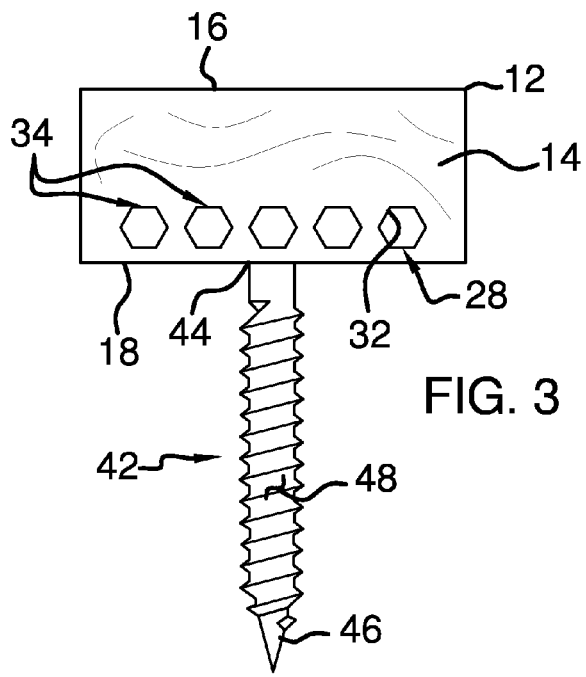
FIG. 3 is a right side view of an embodiment of the disclosure.
Figure 4:
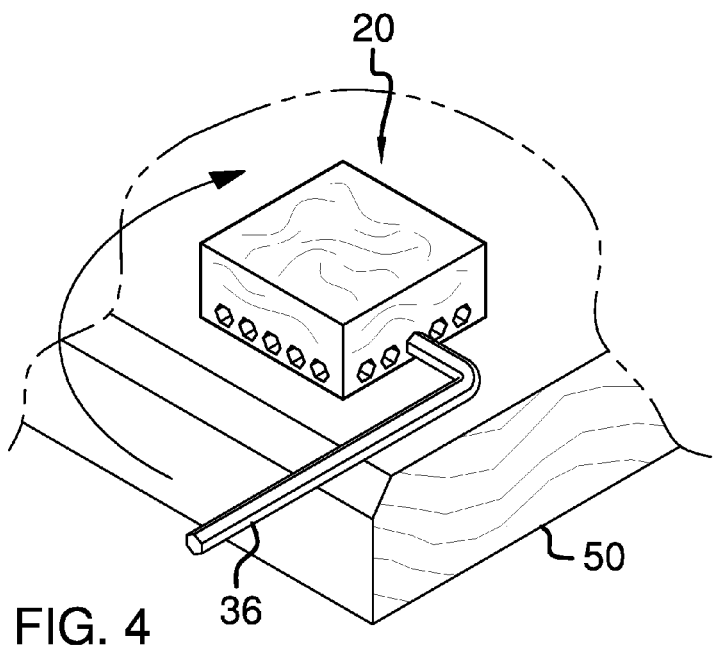
FIG. 4 is an in-use view of an embodiment of the disclosure.
Figure 5:
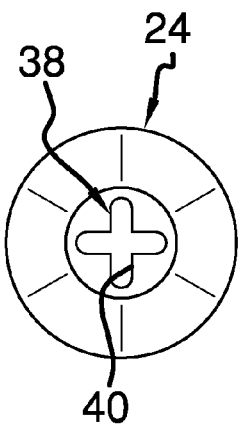
FIG. 5 is a top perspective view of an embodiment of the disclosure.
Figure 6:
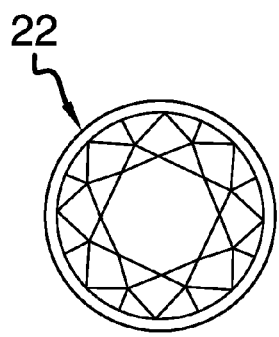
FIG. 6 is a top perspective view of an alternative embodiment of the disclosure.
Figure 7:
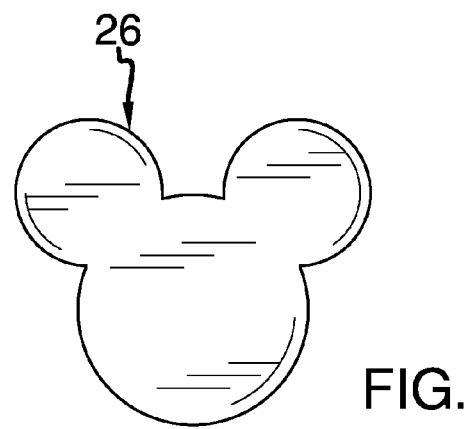
FIG. 7 is a top perspective view of an alternative embodiment of the disclosure.

As best illustrated in FIGS. 1 through 7, the ornamental fastener assembly 10 generally comprises a head 12. An outer edge 14 of the head 12 extends between a top surface 16 and a bottom surface 18 of the head 12. The outer edge 14 of the head 12 defines an ornamental shape. The ornamental shape of the head 12 may comprise a square 20, a diamond 22, a circular shape 24 or the shape of a cartoon character. 26

The outer edge 14 of the head 12 has a tool well 28 extending therein. The tool well 28 is positioned proximate the bottom surface 18 of the head 12. Additionally, the tool well 28 may have a depth between 6 mm and 12 mm.

A bounding surface 30 of the tool well 28 has a plurality of sides 32. The plurality of sides 32 of the bounding surface 30 of the tool well 28 is oriented at an acute angle with each other. The bounding surface 30 of the tool well 28 defines a hexagonal shape.

The tool well 28 is one of a plurality of the tool wells 34. The plurality of tool wells 34 is evenly spaced apart and distributed along an entire length of the outer edge 14 of the head 12. Continuing, the tool well 28 may insertably receive a tool 36. The tool 36 may be an allen wrench of any conventional design.

The top surface 16 of the head 12 may have a second tool well 38 extending downwardly therein. A defining surface 40 of the second tool well 38 defines a cross shape. Finally, the second tool well 38 may insertably receive a phillips screwdriver of any conventional design.

A shaft 42 is provided. The shaft 42 has a top end 44 and a bottom end 46. Additionally, the shaft 42 is elongated between the top 44 and bottom 46 ends of the shaft 42. The bottom end 46 of the shaft 42 tapers to a point. Lastly, the shaft 42 may have a length of at least 2 cm.

The top end 44 of the shaft 42 is coupled to the bottom surface 18 of the head 12. The shaft 42 is centrally positioned on the bottom surface 18 of the head 12. An outer surface 48 of the shaft 42 is threaded. The head 12 is positionable such that a bottom end 46 of the shaft 42 engages an object 50. The object 50 may be a wooden object of any conventional design.

The head 12 is rotated so the outer surface 48 of the shaft 42 threadably engages the object 50. The shaft 42 is urged downwardly into the object 50 until a bottom surface 18 of the head 12 abuts the object 50. The assembly 10 may be one of a plurality of assemblies 10.

In use, the tool 36 is inserted into a selected one of the plurality of tool wells 34. The tool 36 is used to rotate the head 12 so the shaft 42 is urged into the object 50. The assembly 10 is used to decorate the object 50. Alternatively, a phillips screwdriver is inserted into the second tool well 38. The phillips screwdriver is used to rotate the head 12 so the shaft 42 is urged into the object 50. The plurality of assemblies 10 is arranged in any selected pattern on the object 50.

With respect to the above description, it is to be realized that the optimum dimensional relationship for the various components of the ornamental fastener assembly 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the ornamental fastener assembly 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An ornamental fastener assembly configured to enhance an appearance of an object, said assembly comprising:
    a head having an outer edge defining an ornamental shape; and
    a shaft coupled to said head, said shaft configured to penetrate the object such that said head is coupled to the object;
    wherein said outer edge of said head having a tool well extending therein; wherein said tool well is configured to receive a tool that is able to rotate said head in order for said shaft to penetrate the object;
    wherein a bounding surface of said tool well having a plurality of sides being oriented at an acute angle with each other;
    wherein said bounding surface of said tool well defines a hexagonal shape.

2. The assembly according to claim 1, wherein said outer edge of said head extending between a top surface and a bottom surface of said head.

3. The assembly according to claim 1, wherein said tool well being positioned proximate a bottom surface of said head.

4. The assembly according to claim 1, wherein said tool well being one of a plurality of said tool wells.

5. The assembly according to claim 4, wherein said plurality of tool wells being evenly spaced apart and distributed along an entire length of said outer edge of said head.

6. The assembly according to claim 1, wherein said shaft having a top end and a bottom end.

7. The assembly according to claim 1, wherein said shaft being elongated between a top and bottom end of said shaft.

8. The assembly according to claim 1, wherein a bottom end of said shaft tapering to a point.

9. The assembly according to claim 1, wherein a top end of said shaft being coupled to a bottom surface of said head.

10. The assembly according to claim 9, wherein said shaft is centrally positioned on said bottom surface of said head.

11. The assembly according to claim 1, wherein an outer surface of said shaft being threaded.

12. The assembly according to claim 1, wherein said head being positionable such that a bottom end of said shaft engages the object, said head being rotated such that an outer surface of said shaft threadably engages the object such that said shaft is urged downwardly into the object until a bottom surface of said head abuts the object.

13. An ornamental fastener assembly configured to enhance an appearance of an object, said assembly comprising:
    a head having an outer edge extending between a top surface and a bottom surface of said head, said outer edge of said head defining an ornamental shape; and
    a shaft coupled to said head, said shaft penetrating the object such that said head is coupled to the object;
    wherein said outer edge of said head having a tool well extending therein; said tool well being positioned proximate a bottom surface of said head; wherein said tool well is configured to receive a tool that is able to rotate said head in order for said shaft to penetrate the object.

14. The assembly according to claim 13, wherein a bounding surface of said tool well having a plurality of sides being oriented at an acute angle with each other wherein said bounding surface of said tool well defines a hexagonal shape; said tool well being one of a plurality of said tool wells; said plurality of tool wells being evenly spaced apart and distributed along an entire length of said outer edge of said head.

15. The assembly according to claim 13, wherein said shaft having a top end and a bottom end; said shaft being elongated between said top and bottom ends of said shaft; said bottom end of said shaft tapering to a point; said top end of said shaft being coupled to a bottom surface of said head wherein said shaft is centrally positioned on said bottom surface of said head.

16. The assembly according to claim 13, wherein an outer surface of said shaft being threaded; said head being positionable such that a bottom end of said shaft engages the object; said head being rotated such that said outer surface of said shaft threadably engages the object such that said shaft is urged downwardly into the object until a bottom surface of said head abuts the object.

* * * * *